(12) United States Patent
Liu

(10) Patent No.: US 11,551,206 B2
(45) Date of Patent: Jan. 10, 2023

(54) METHODS, BLOCKCHAIN NODES, AND STORAGE MEDIA FOR DEPLOYING SMART CONTRACT

(71) Applicant: ALIPAY (HANGZHOU) INFORMATION TECHNOLOGY CO., LTD., Zhejiang (CN)

(72) Inventor: Qi Liu, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/355,411

(22) Filed: Jun. 23, 2021

(65) Prior Publication Data

US 2021/0319438 A1 Oct. 14, 2021

(30) Foreign Application Priority Data

Aug. 31, 2020 (CN) .......................... 202010899198.7

(51) Int. Cl.
*H04L 9/32* (2006.01)
*G06Q 20/38* (2012.01)
(Continued)

(52) U.S. Cl.
CPC ....... *G06Q 20/3825* (2013.01); *G06Q 20/389* (2013.01); *G06Q 20/3829* (2013.01);
(Continued)

(58) Field of Classification Search
CPC ........... G06Q 20/3825; G06Q 20/3829; G06Q 20/389; G06Q 20/10; G06Q 20/02;
(Continued)

(56) References Cited

U.S. PATENT DOCUMENTS

| 2005/0136939 A1 | 6/2005 | Mountain et al. |
| 2011/0225420 A1 | 9/2011 | Eigler et al. |

(Continued)

FOREIGN PATENT DOCUMENTS

| CN | 105164642 A | * 12/2015 | ............... G06F 9/45 |
| CN | 105164642 A | * 12/2015 | ............... G06F 8/41 |

(Continued)

OTHER PUBLICATIONS

Mo Dong, Celer Network: Bring Internet Scale to Every Blockchian, arXiv (Year: 2018).*

(Continued)

*Primary Examiner* — Neha Patel
*Assistant Examiner* — Chunling Ding
(74) *Attorney, Agent, or Firm* — Fish & Richardson P.C.

(57) ABSTRACT

A computer-implemented method, non-transitory, computer-readable medium, and computer-implemented system are provided for deploying a smart contract in a blockchain network. The computer-implemented method includes: receiving, by a blockchain node in a blockchain network, a transaction for creating a smart contract, wherein the transaction comprises machine codes of the smart contract, and the machine codes of the smart contract are obtained by a compilation service provider performing Ahead of Time (AoT) compilation on bytecodes of the smart contract; determining, by the blockchain node, that the machine codes of the smart contract are obtained by a trusted compilation service provider; and in response to determining that the machine codes of the smart contract are obtained by the trusted compilation service provider, completing, by the blockchain node, a deployment of the smart contract.

15 Claims, 8 Drawing Sheets

(51) Int. Cl.
*H04L 9/08* (2006.01)
*H04L 9/00* (2022.01)

(52) U.S. Cl.
CPC ............ *H04L 9/083* (2013.01); *H04L 9/3247* (2013.01); *H04L 9/50* (2022.05); *H04L 2209/56* (2013.01)

(58) Field of Classification Search
CPC ............ G06Q 2220/00; G06Q 20/4014; H04L 9/3247; H04L 9/083; H04L 2209/56; H04L 2209/38; H04L 9/3239; H04L 63/126; H04L 9/50; G06F 8/41; G06F 9/45504; G06F 9/4552
See application file for complete search history.

(56) References Cited

U.S. PATENT DOCUMENTS

| | | | |
|---|---|---|---|
| 2016/0283712 A1* | 9/2016 | Kanhere | G06F 9/4856 |
| 2018/0089758 A1 | 3/2018 | Stradling et al. | |
| 2020/0336907 A1* | 10/2020 | Jain | H04W 12/104 |
| 2020/0344132 A1* | 10/2020 | Padmanabhan | H04L 41/22 |
| 2020/0351074 A1* | 11/2020 | Wood | H04L 9/0637 |
| 2021/0073287 A1* | 3/2021 | Hunter | H04L 9/3239 |
| 2021/0091960 A1* | 3/2021 | Werner | H04L 63/12 |
| 2021/0165890 A1* | 6/2021 | Schvey | H04L 9/3297 |

FOREIGN PATENT DOCUMENTS

| | | | | |
|---|---|---|---|---|
| CN | 108765158 | | 11/2018 | |
| CN | 108768988 A | * | 11/2018 | ......... H04L 63/0442 |
| CN | 110033368 | | 7/2019 | |
| CN | 110675256 | | 1/2020 | |
| CN | 111316595 | | 6/2020 | |
| CN | 111324645 A | * | 6/2020 | ............ G06Q 40/04 |
| CN | 111402033 A | * | 7/2020 | ........... G06Q 40/025 |
| CN | 111538521 | | 8/2020 | |
| WO | WO-2014176587 A2 | * | 10/2014 | ............ G06F 8/443 |
| WO | WO-2020150741 A1 | * | 7/2020 | ........... G06Q 20/065 |
| WO | WO 2020150741 A1 | * | 7/2020 | ........... G06Q 20/065 |

OTHER PUBLICATIONS

Mo Dong, Celer Network: Bring Internet Scale to Every Blockchain, Sep. 28, 2018 (Year: 2018).*
Bai, "FISCO BCOS 2.0 Principle Analysis: Pre-Compiled Contract Architecture Design," retrieved on Jun. 28, 2021, retrieved from URL https://fisco-bcos-documentation.readthedocs.io/zh_CN/latest/docs/articles/3_features/35_contract/pre-compiled_contract_architecture_design.html, 13 pages (with machine translation).
Brown [online], "EOS 2.0 Announced With Multi-threading and EOS VM JIT Compiler," Oct. 7, 2019, retrieved on or before Jul. 7, 2021, retrieved from URL<https://www.kompulsa.com/2019/10/07/eos-2-0-released-with-multi-threading-and-eos-vm-jit-compiler/>, 5 pages.
Crosby et al., "BlockChain Technology: Beyond Bitcoin," Sutardja Center for Entrepreneurship & Technology Technical Report, Oct. 16, 2015, 35 pages.
Li et al., "An overview on practice of FISCO BCOS technology and application," Information and Communications Technology and Policy, Jan. 2020, pp. 52-60 (with English abstract).
medium.com [online], "Ontology Wasm-JIT Released: A Leading Smart Contract Virtual Machine with High Speed and Performance," Mar. 12, 2020, retrieved on Jul. 7, 2021, retrieved from URL<https://medium.com/ontologynetwork/ontology-wasm-jit-released-a-leading-smart-contract-virtual-machine-with-high-speed-and-519783fe5055>, 4 pages.
Nakamoto, "Bitcoin: A Peer-to-Peer Electronic Cash System," www.bitcoin.org, 2005, 9 pages.
EP Extended Search Report in European Application No. 21179778. 2, dated Dec. 2, 2021, 12 pages.
Dong et al., "Bring Internet Scale to Every Blockchain", arXiv, Sep. 28, 2018, 56 pages.

* cited by examiner

METHODS, BLOCKCHAIN NODES, AND STORAGE MEDIA FOR DEPLOYING SMART CONTRACT

CROSS-REFERENCE TO RELATED APPLICATIONS

This application claims priority to Chinese Patent Application No. 202010899198.7, filed on Aug. 31, 2020, which is hereby incorporated by reference in its entirety.

TECHNICAL FIELD

The present disclosure relates to the field of blockchain technologies, and in particular, to methods, blockchain nodes, and storage media for deploying a smart contract.

BACKGROUND

Blockchain is a new application mode of computer technologies such as distributed data storage, peer-to-peer transmission, consensus mechanism and encryption algorithm and the like. The advent of smart contracts in the blockchain 2.0 era promotes the application scope of blockchain to a new level. With a smart contract, the blockchain can also invoke a segment of codes which can be user-defined in addition to performing transfer transactions.

SUMMARY

The present disclosure provides methods, blockchain nodes, and storage media for deploying a smart contract.

The methods and blockchain nodes for deploying a smart contract, and the storage media provided by embodiments of the present disclosure are implemented in the following manners:

Provided is a method for deploying a smart contract, including:

sending, by a client device, bytecodes of the smart contract to a compilation service provider, and receiving machine codes obtained by the compilation service provider performing AoT compilation for the bytecodes;

receiving, by a blockchain node, a transaction for creating the smart contract submitted by the client device, wherein the transaction includes the machine codes of the smart contract;

completing, by the blockchain node, a deployment of the smart contract in response to determining that the machine codes are obtained by a trusted compilation service provider compiling the bytecodes.

Provided is a method for deploying a smart contract, including:

receiving, by a blockchain node, a transaction for creating the smart contract, wherein the transaction includes machine codes of the smart contract, and the machine codes are obtained by a compilation service provider performing AoT compilation for bytecodes of the smart contract;

completing, by the blockchain node, a deployment of the smart contract in response to determining that the machine codes are obtained by a trusted compilation service provider compiling the bytecodes.

Provided is a blockchain node for deploying a smart contract, configured to implement the methods as described above.

Provided is a blockchain node for deploying a smart contract, including:

a processor, a memory having programs stored thereon, wherein the programs are executed by the processor to implement the methods as described above.

Provided is a storage media for storing programs, wherein the programs are executed to perform operations in the methods as described above.

In the embodiments of the present disclosure, before deploying a smart contract to a blockchain, the client device can first send the bytecodes of the smart contract to the compilation service provider for compiling the bytecodes into corresponding machine codes through AoT, so that the machine codes of the smart contract can be directly deployed on the blockchain. In this way, when the smart contract is invoked, efficient operation can be achieved based on the deployed machine codes. Due to the characteristics of the machine codes, the machine codes can perform much more operations than the bytecodes, which consequently brings more risks, for example, causes privacy data stored in the blockchain node to be leaked and affects stable operation of the blockchain node and the like. For a transaction for creating a smart contract, the compilation service provider of the machine codes included in the transaction can be restricted such that a trusted compilation service provider performs endorsement for security of the machine codes, thereby preventing the machine codes generated by a non-trusted compilation service provider from being deployed on the blockchain, and reducing or eliminating the above-mentioned risks.

DESCRIPTION OF THE EMBODIMENTS

Figure 1:
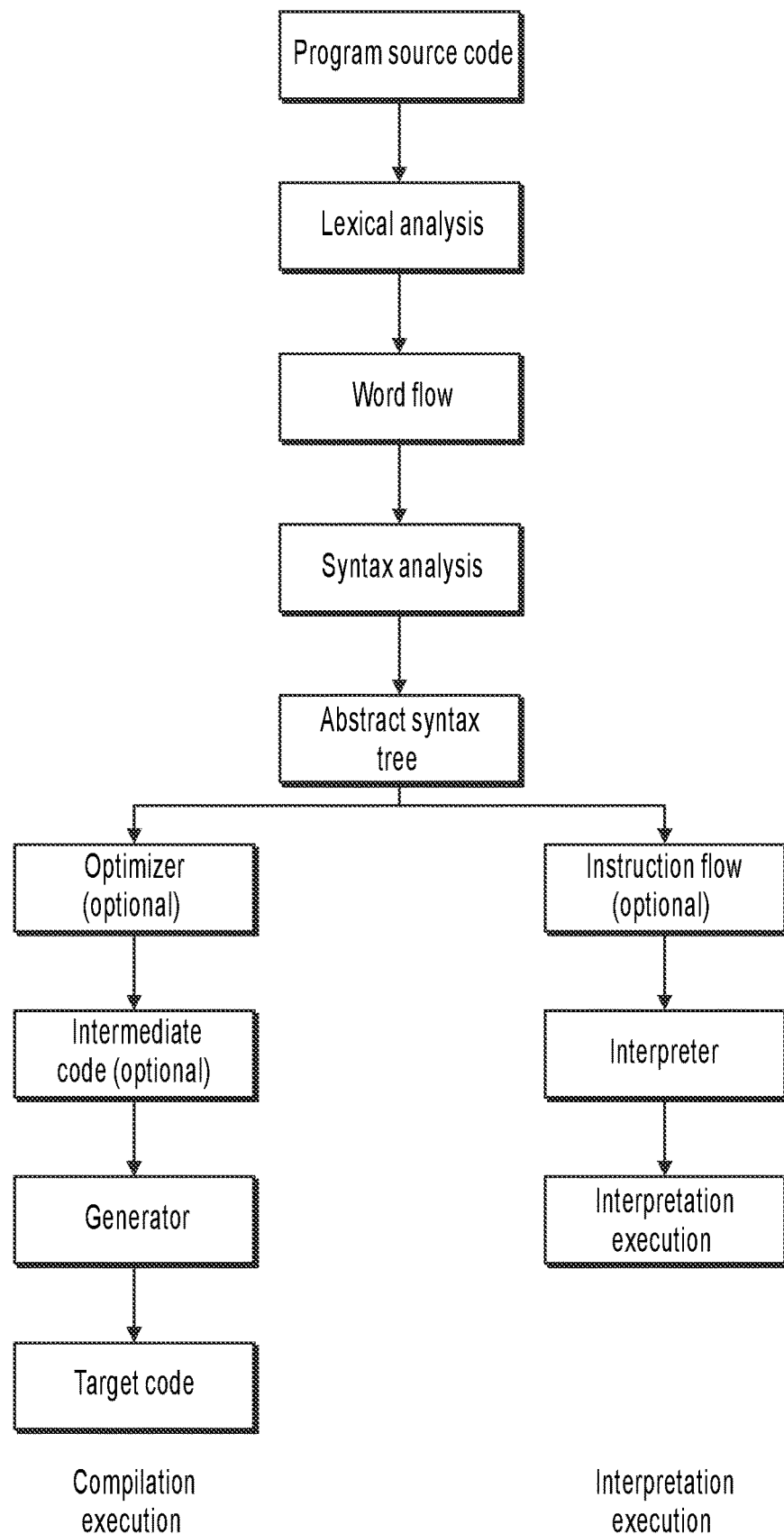
FIG. 1 is a principle diagram of a compilation execution and an interpretation execution according to one or more embodiments of the present disclosure.

Example embodiments will be described in detail herein with the examples thereof expressed in the drawings. When the following descriptions involve the drawings, same numbers in different drawings represent same or similar elements unless stated otherwise. The implementations described in the following example embodiments do not represent all implementations consistent with one or more embodiments of the present disclosure. On the contrary, they are merely embodiments of an apparatus and a method consistent with some aspects of one or more embodiments of the present disclosure described in detail in the appended claims.

It should be noted that the steps of corresponding method is not necessarily performed according to the sequence shown in the present disclosure in other embodiments. In some other embodiments, the steps included in the corresponding method can be more or less than described in the specification. Further, a single step described in the specification may be divided into several steps for descriptions in other embodiments while several steps described in the specification may be combined into a single step for descriptions in other embodiments.

The blockchain 1.0 era generally refers to a period from 2009 to 2014, which is a blockchain application development stage represented by bitcoin. In this period, the emphasis is attached to solving the decentralization problem of currency and means of payment. Since 2014, developers pay more attention on solving the deficiencies of technology and extension of bitcoin. At the end of 2013, Vitalik Buterin published an Ethereum white book "Ethereum: a next generation smart contract and decentralized application platform", which introduced smart contract into blockchain, and opened applications of blockchains outside currency field, thereby starting the blockchain 2.0 era.

The smart contract is a computer contract that can be automatically executed based on a specified trigger rule, or can be deemed as a digital version of a conventional contract. The concept of the smart contract was proposed first by interdisciplinary legal scholar and cryptography researcher Nick Szabo in 1994. This technology was not applied to actual industries due to lack of programmable digital system and related technologies until blockchain technology and Ethereum emerged to provide reliable execution environment for the technology. Because the blockchain technology adopts blockchain-type ledger, generated data is immutable or undeletable and the entire ledger will continuously add ledger data, thereby ensuring traceability of historical data. At the same time, a decentralized operation mechanism avoids the impacts of centralization factors. A smart contract based on blockchain technology will not only exert its advantages in cost and efficiency but also avoid interference of malicious behaviors for normal contract execution. When the smart contract is written into a blockchain in a digital form, the characteristics of the smart contract can guarantee the transparency, traceability and immutability in the entire process of storage, reading and execution.

A smart contract essentially is a segment of computer-executable programs. Like widely-used computer programs, the smart contract can be written based on high-level language (such as C language and C++ language and the like). Program codes of the smart contract written based on high-level language generally can be converted, through a "compiler", into "machine codes" that can be identified and run by a CPU of a computer and thus the CPU can further execute such machine codes (or called "microprocessor instructions"). This manner is generally referred to as "compilation execution".

Usually, the compilation execution does not have cross-platform extendibility. Since CPUs of different manufacturers, different brands and different generations exist, instruction sets supported by these different CPUs are different in many cases, for example, x86 instruction set, and ARM instruction set and the like. Further, the instruction sets supported by the CPUs of different generations from the same manufacturer and the same brand (for example, Intel CPUs of different generations) may also be different. Therefore, the same program codes written based on the same high-level language can be converted into different machine codes by compilers on different CPUs. Specifically, in a process of converting program codes written based on high-level language into machine codes, the compiler performs optimization in combination with specific characteristics of CPU instruction sets (for example, vector instruction set and the like) to increase the speed of program execution and such optimization usually is related to specific CPU hardware. As such, for the same machine codes, one machine code can be run on x86 and the another one may not be run on ARM. Further, even for the same x86 platform, the instruction sets are enriched and expanded continuously over time, which causes the machine codes run by different generations of x86 platforms to be different. Furthermore, because execution of the machine codes needs the CPU to be scheduled by the operating system kernel, the machine codes run by different operating systems may be different in spite of the same hardware.

There is also a program running mode of "interpretation execution" different form the compilation execution. For example, Java language compiles Java source codes into standard bytecodes through a Java compiler. The compiler herein does not refer to an instruction set of any actual hardware processor but defines an abstract standard instruction set. Generally, the compiled standard bytecodes cannot be run directly on a hardware CPU. Therefore, one Java virtual machine (JVM) is introduced which runs on a specific hardware processor to interpret and execute the compiled standard bytecodes.

Java virtual machine (JVM) is a virtual computer which is usually implemented by simulating various computer functions on an actual computer. The JVM shields information relating to specific hardware platform, and operating system and the like, so that the Java program only needs to generate standard bytecodes that can be run on Java virtual machine, and thus the Java program can be run on various types of platforms without any modification.

One important feature of the Java language is platform-independence. Use of the Java virtual machine is the key to realize the feature. Generally, a high-level language at least needs to be compiled into different target codes if the high-level language is to be run on different platforms. With introduction of Java virtual machine, Java language does not need to be re-compiled when run on different platforms. Java language shields information relating to specific platform through the Java virtual machine, so that as long as the Java language compilation program generates target codes (bytecodes) that can be run on the Java virtual machine, the program can be run without modification on various types of platforms. When executing bytecodes, the Java virtual machine interprets the bytecodes as machine instructions of a specific platform for execution. This is why Java can be run everywhere after being compiled once.

JVM runs on a specific hardware processor to perform interpretation and execution of bytecodes for the specific running processor it runs and shield up these bottom-layer differences, presenting a standard development specification to the developers. When executing the bytecodes, the JVM actually interprets the bytecodes as machine instructions of a specific platform for execution eventually. Specifically, after receiving the input bytecodes, the JVM interprets the instructions one by one and translates them into machine codes suitable for a current machine for operation. These processes are interpreted and executed, for example, by an interpreting device named interpreter. As such, the developers of Java programs do not need to consider on which hardware platform the written program codes will be run. The development of JVM itself is completed by professional developers organized by Java to adapt the JVM to different processor architectures. Until now, there are only a restricted number of mainstream processor architectures such as X86, ARM, RISC-V, and MIPS. The professional developers port the JVM to the platforms supporting these types of specific hardware respectively and then the Java program theoretically can be run on all machines. The porting work of the JVM is generally provided by professional personnel organized by Java, which greatly reduces the burden of the Java application developers.

The interpretation execution brings cross-platform portability. But, since the bytecode execution undergoes the intermediate interpretation of JVM, the execution efficiency is not higher than the above-mentioned compilation execution, the efficiency difference can be up to dozens of times sometimes.

FIG. 1 shows similarities and differences of compilation execution and interpretation execution. A machine may not read and understand application programs to acquire execution capability like human regardless of whether it is in interpretation execution or compilation execution or whether it is a physical machine or a virtual machine. Most of program codes need to go through various steps in FIG. 1 before being converted into target codes of a physical machine or instruction sets executable by a virtual machine. In FIG. 1, the branch from top to left refers to a generation process from program codes to target machine codes in a conventional compilation principle, and the branch from top to right refers to a process of the interpretation execution. The languages based on physical machine, Java virtual machine or other non-Java high-level language virtual machines (HLLVM) mostly follow the idea based on modem classical compilation principle. Before execution, lexical analysis and syntax analysis are performed for the program source codes to convert the source codes into an abstract syntax tree (AST). For implementation of a specific language, the lexical analysis, the syntax analysis, and subsequent optimizer and target code generator can be selected as independent of an execution engine so as to form a compiler with complete meaning for the implementation, which is represented by C or C++ language. Alternatively, part of the steps (for example, step before the abstract syntax trees is generated) can be implemented as a semi-independent compiler, which is represented by Java language. Alternatively, these steps and the execution engine are all encapsulated in a closed black box like most JavaScript actuators.

To give consideration to cross-platform portability and high performance as possible, the concept of the just-in-time (JIT) compiler is proposed. The core idea of the JIT is "how to efficiently avoid repeated work of interpretation instructions". There are a large number of repeatedly-executed codes in computer programs, for example, some computing "functions" may be cyclically invoked many times in one program execution process. In a case of interpretation execution, interpretation of the function from bytecodes to machine codes is needed for each execution of a cyclic process. However, actually, the machine codes generated in dozens of interpretations of the function are totally the same. Naturally, after the first interpretation, the interpreted machine codes of the function are cached. In a subsequent execution process, the cached codes can be directly used without performing interpretation again, thus improving the execution efficiency.

On the contrary, some functions are executed only once during a program running cycle (for example, startup initialization). Therefore, this type of functions does not need to be cached and one interpretation execution is directly performed once. Thus, one core module in the JIT technology is "hotspot analysis", that is, which codes have been executed several times is analyzed in a program execution process, so as to cache the interpreted machine codes. Those operations executed a smaller number of times do not need to be cached. In this way, an optimal balance of execution efficiency and memory overhead can be reached.

Furthermore, another core module of the JIT technology is compilation optimization (or called optimized compilation). Those machine codes directly interpreted are not optimized in combination with context and only those high frequency machine codes are cached, bringing restricted performance improvement. In order to obtain a better performance, further optimization can be performed for the compiler. The manner of the compilation optimization usually takes more time.

Figure 2:
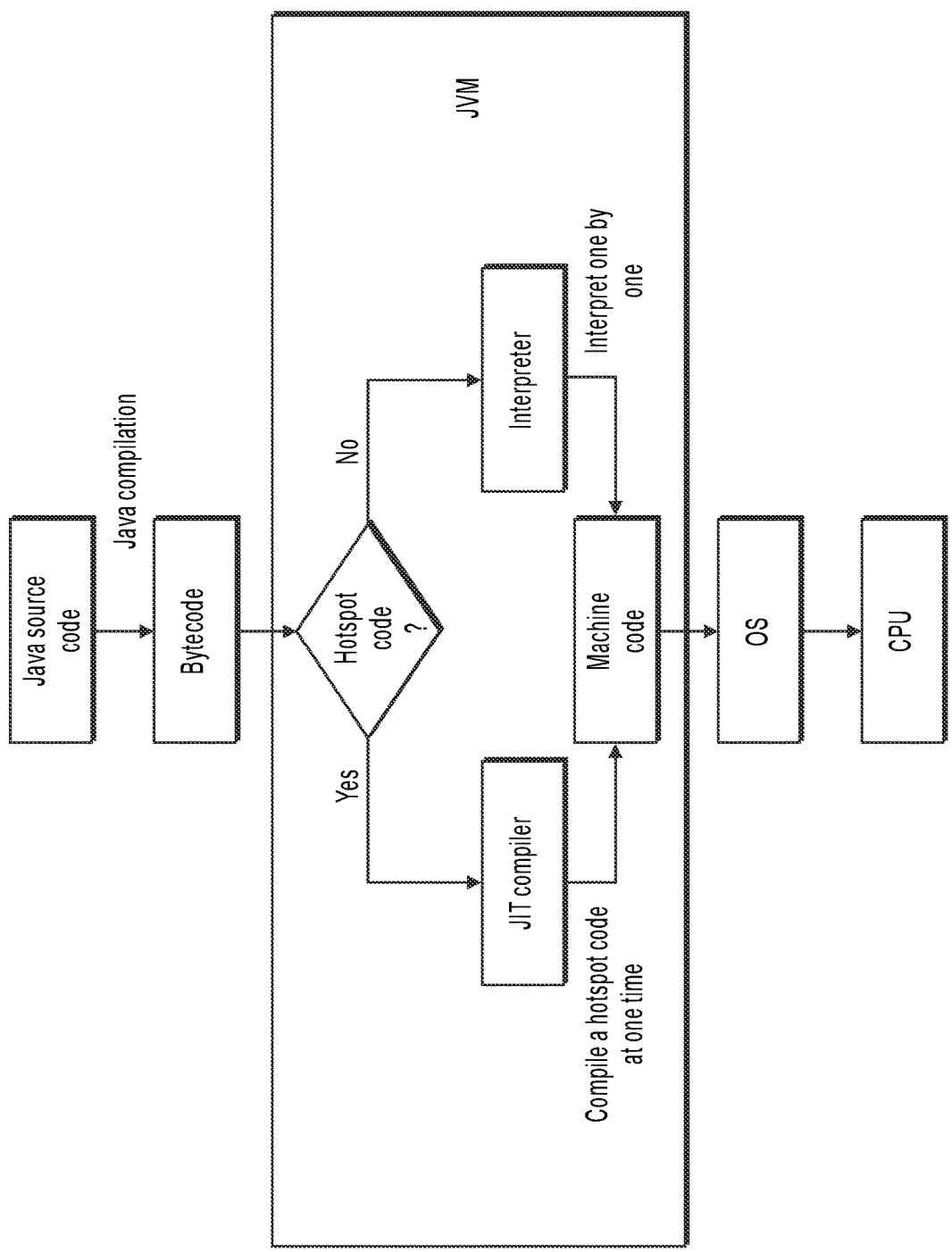
FIG. 2 is a principle diagram of an interpretation execution and Just-In-Time (JIT) compiler according to one or more embodiments of the present disclosure.

The working principle of the JIT is as shown in FIG. 2. After being compiled by the Java compiler, the Java source codes generate a segment of Java bytecodes which is distributed to two execution paths (JIT compiler and Interpreter) after going through hotspot analysis. Those codes determined as hotspot (high frequency execution) are compiled in the JIT compiler into machine codes which are cached and executed generally by a CPU under the control of an operating system (OS). Those low frequency codes enter an interpreter and then are interpreted into machine codes which are executed by the CPU under the control of the OS.

Due to correlation of backward and forward of the program code, there is usually a large optimization space for the compilation process. The optimized machine codes will have much higher execution efficiency than the directly-interpreted machine codes. In order to obtain better performance, it is needed to perform optimization for the compiler. It is possible for the JIT compiler to take more time to perform compilation. Especially, the JIT compiler may take a very long time in the first compilation of the bytecodes and may even take a longer time than the interpretation execution. Thus, for some Java programs, if the hotspots are not prominent, that is, the overall execution frequency is not very high and the overall execution process is very long, it will be difficult for the JIT to exert the advantages of the compilation execution.

Furthermore, another idea called Ahead of Time (AoT) is proposed. The AoT is equivalent to a pre-compilation execution method. Before the programs are run, machine codes are obtained by performing one compilation for the bytecodes for a target execution environment and then deployed to a target machine for execution. The running efficiency of the AoT can reach the effect of the compilation execution. However, it is needed to clearly know hardware, instruction set architecture and system and the like of a target system in a case of AoT, so as to ensure the compiled codes can be run. Further, generally, the number of statements needed for expressing an instruction of the same function using machine codes is larger than using bytecodes and much larger than using codes written based on high-level language. As such, for the program with the same content, it is possible that the size of machine codes>size of bytecodes>size of high-level language codes. Under the precondition of clearly knowing the hardware, instruction set architecture and system and the like of the target system, the bytecodes can be compiled into machine codes through AoT. At the same time, the machine codes of the target systems of different categories are different. Thus, to ensure corresponding correctly-executed machine codes are in various target systems, machine codes of different versions may need to be provided. In this way, a total size of the machine codes is generally larger than that of bytecodes or high-level language codes.

For example, Android earlier than 5.0 version adopts Dalvik virtual machine and Android after 5.0 version adopts ART virtual machine. Dalvik adopts JIT compiler to interpret bytecodes and ART adopts AoT mechanism. In the ART manner, the bytecodes (the installation process of Android App actually is installation of bytecodes of programs) are pre-compiled into machine codes at the time of application installation. After the process of code interpretation is removed, the application program on Android can be executed more efficiently and started more quickly.

Blockchain, as a decentralized distributed system, needs to maintain distributed consistency. Specifically, in a group of nodes of the distributed system, each node is in-built with a state machine. Each state machine needs to execute the same instruction in the same order from the same initial state to keep each change of state the same, thereby ensuring consistent state is eventually achieved. But, it is difficult for each node device in the same blockchain network to have the same hardware configuration and software environment. Therefore, to ensure the processes and the results of smart contract executions on various nodes are the same, an Ethereum Virtual Machine (EVM) similar to the JVM virtual machine is adopted in an Ethereum representing the blockchain 2.0. Differences of hardware configuration and software environment of various nodes can be shielded by EVM. As such, the developers can develop a set of codes of a smart contract, compile the codes of the smart contract locally and then upload the bytecodes obtained by compilation to a blockchain. Various nodes perform interpretation execution for the same bytecodes using the same EVM from the same initial state and then obtain the same final result and the same intermediate result and thus can shield differences of hardware and environment in different node bottom-layer. In this way, the emergence of decentralized blockchain technology has enabled the implementation of the smart contracts proposed as early as 1994, and, because the implementation of decentralization inevitably faces differences in the hardware and operating environment of different execution machines, furthermore, the smart contract is processed by interpretation execution to ensure that the same execution results can be obtained on decentralized machines with different hardware and operating environment.

EVM is a turing complete virtual machine, which means that various complex logic can be realized with the virtual machine. This is also one of the largest improvements of the Ethereum representing the blockchain 2.0 compared with blockchain 1.0. The smart contract published and invoked by a user in the Ethereum can be run on the EVM. As mentioned above, the EVM directly runs bytecodes and therefore the smart contract deployed on the blockchain can be in the form of bytecodes.

Figure 3:
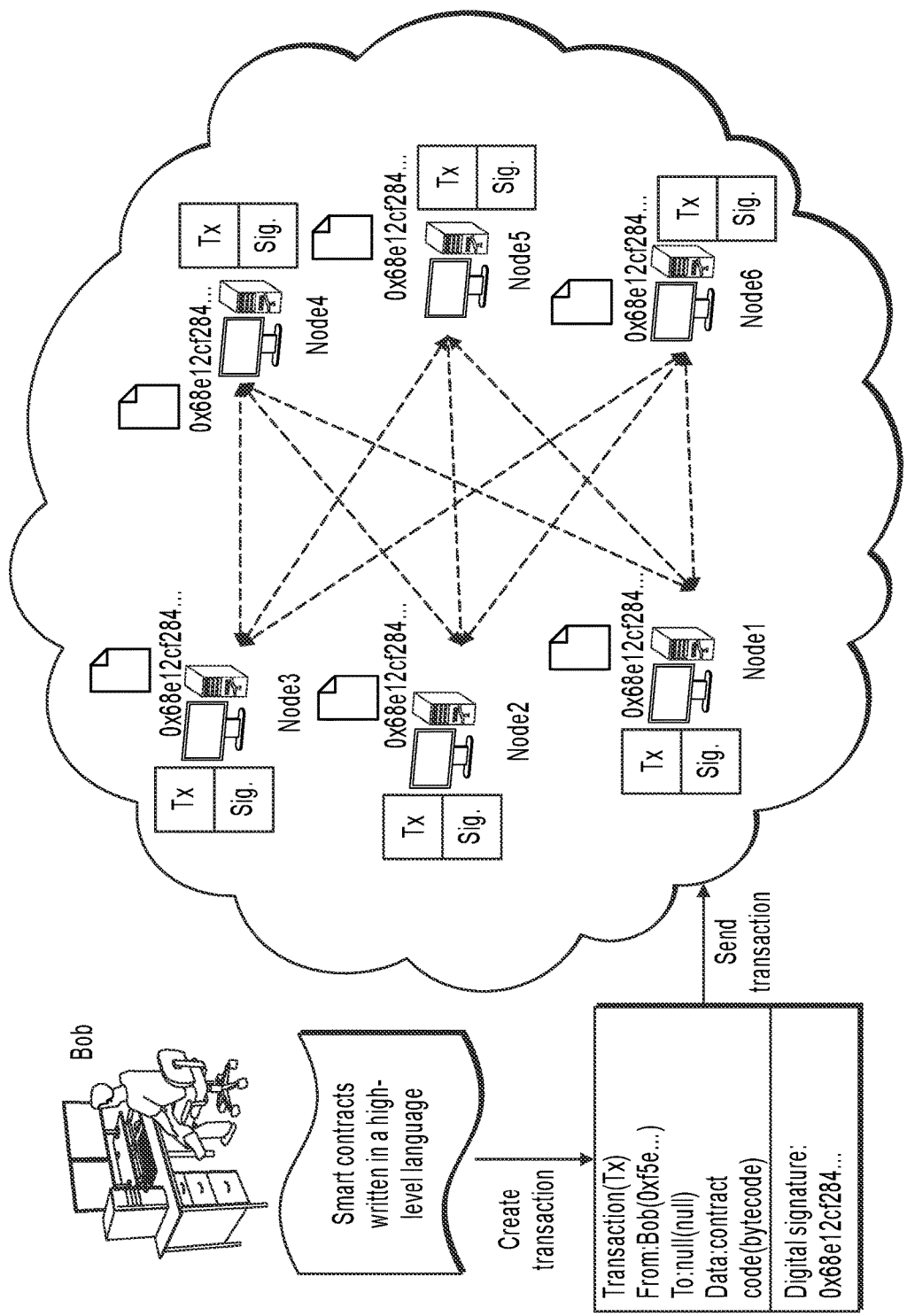
FIG. 3 is a schematic diagram of a process of creating a smart contract according to one or more embodiments of the present disclosure.

As shown in FIG. 3, after Bob sends a transaction containing information for creating a smart contract to an Ethereum network, an EVM of a node 1 can execute the transaction and generate a corresponding contract instance. The data field of the transaction can store bytecodes, and the to field of the transaction can be a null address. After an agreement is reached among nodes through consensus, the contract is successfully created and a user can invoke the contract subsequently.

After creation of the contract, a contract account corresponding to the smart contract appears on the blockchain and has a specific address. Contract codes and account storage can be stored in the contract account. The behaviors of the smart contract are controlled by the contract codes while the account storage of the smart contract stores a state of the contract. In other words, the smart contract enables a virtual account containing contract codes and account storage to be generated on the blockchain.

As mentioned above, the data field of the transaction containing creation of a smart contract can store the bytecodes of the smart contract. The bytecodes includes a string of bytes, each of which represents one operation. Based on considerations of development efficiency and readability and the like, the developers can not directly write bytecodes but write smart contract codes based on a high-level language. The smart contract codes written based on high-level language is compiled into bytecodes by a compiler and the bytecodes are then deployed to the blockchain. Ethereum supports many high-level languages such as Solidity language, Serpent language, and LLL language and the like.

Solidity language is used as an example, a contract written using Solidity language is very similar to a class in an object-oriented programming language. In a contract, multiple members can be declared such as state variable, function, function modifier, and event and the like. The state variable is a value permanently stored in the account storage of the smart contract, which is used to store the state of the contract.

A code example 1 of a simple smart contract written using Solidity language is shown below:

```
Contract Example{
    int balance;
    function C( ){
        balance + = 1;
    }
    functiongetbalance( ) returns(int){
        return balance;
    }
}
```

Generally, after the contract is deployed on the blockchain, the state variable "balance" can be a newly-defined asset type in the contract. The function C( ) can define change operation of the balance, and the function getbalance( ) returns(int) can define an operation of taking a current value of the balance and returning.

Figure 4:
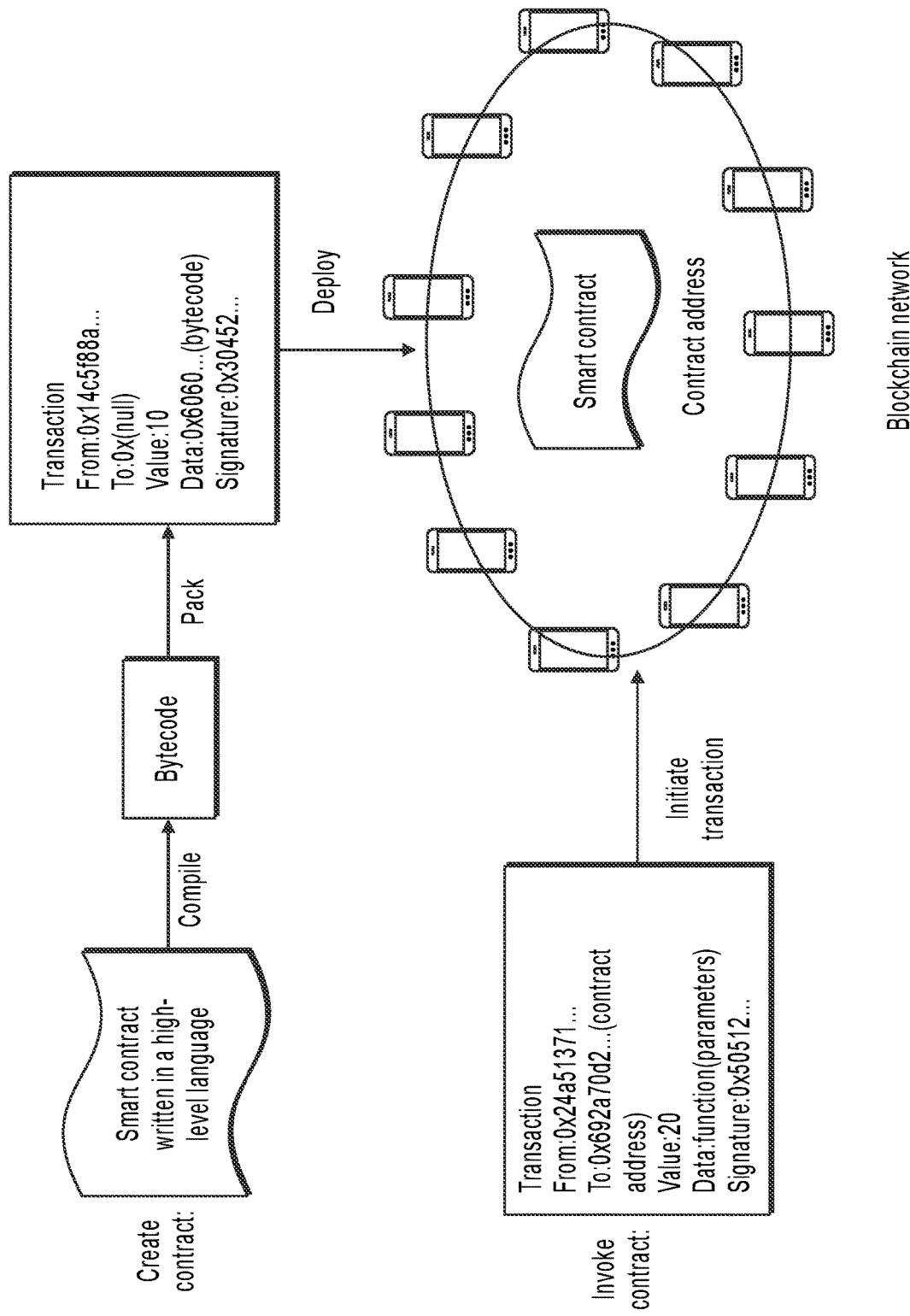
FIG. 4 is a schematic diagram of a process of invoking a smart contract according to one or more embodiments of the present disclosure.

Furthermore, as shown in FIG. 4, still taking Ethereum as an example, Bob sends a transaction containing information for invoking a smart contract to the Ethereum network, and then the EVM of the node 1 can execute the transaction and generate a corresponding contract instance. In FIG. 4, the from field of the transaction is an address of an account initiating an invocation to the smart contract and "0x692a70d2 . . . " in the to field represents an address of the invoked smart contract, the value field is a value of Ether in the Ethereum and the data field of the transaction stores method and parameters for invoking the smart contract. After the smart contract is invoked, the value of the balance may change. Subsequently, a client device can view a current value of the balance through a specific blockchain node.

The smart contract can be executed independently on each node in the blockchain network in a specified manner, and all execution records and data are stored on the blockchain. After the transaction is completed, an immutable and non-losable transaction credential will be stored on the blockchain.

Figure 5:
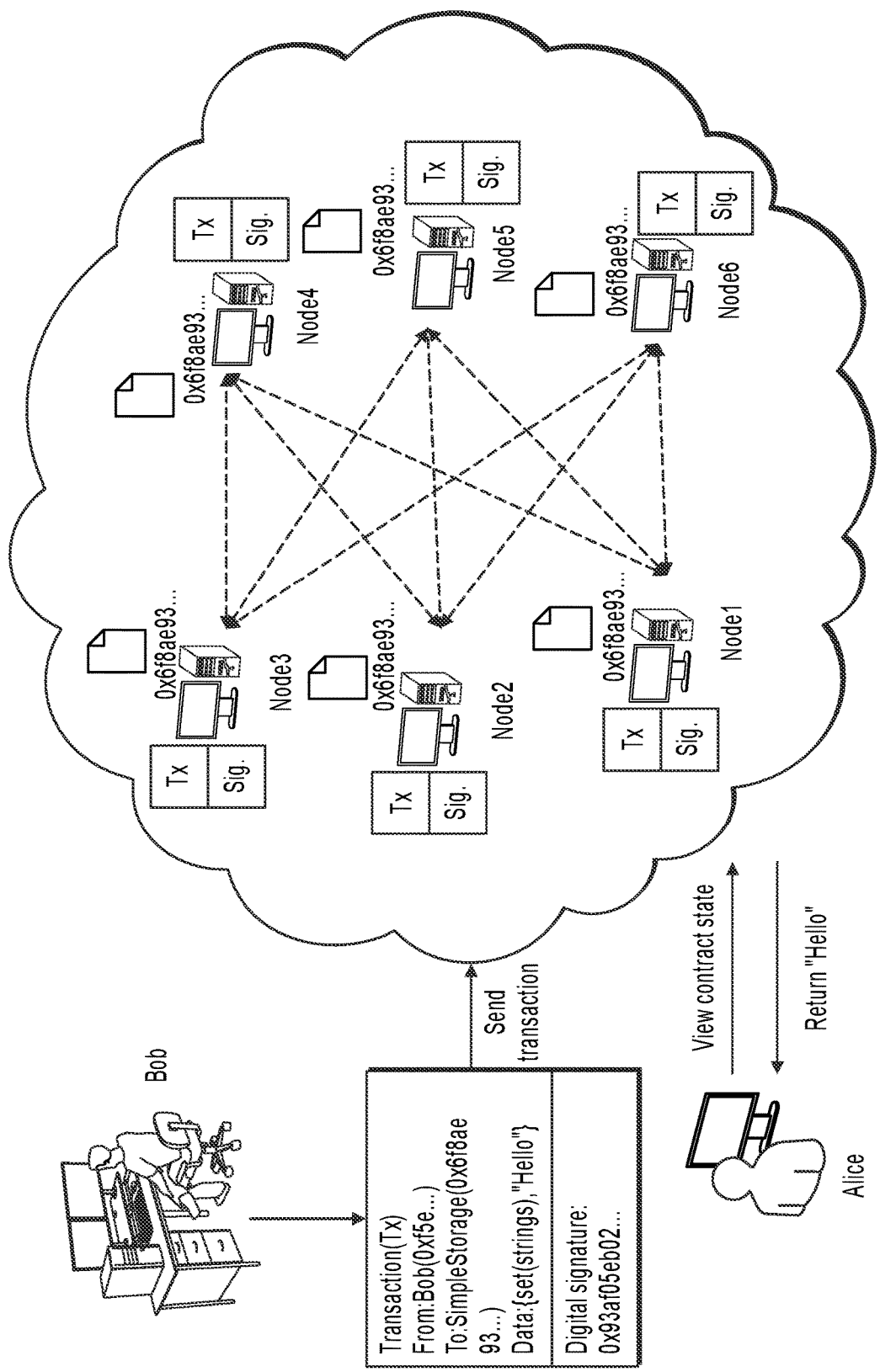
FIG. 5 is a schematic diagram of creating a smart contract and invoking a smart contract according to one or more embodiments of the present disclosure.

FIG. 5 is a schematic diagram of creating a smart contract and invoking a smart contract. To create a smart contract in an Ethereum, the following including writing smart contract, changing into bytecodes and deploying to blockchain and the like need to be processed. In the Ethereum, invoking a smart contract means initiating a transaction pointed to the address of the smart contract (pointing to the address of the smart contract by using the to field in the transaction), and the smart contract codes are run on the virtual machine of each node in the Ethereum network in a distributed manner.

Figure 9:
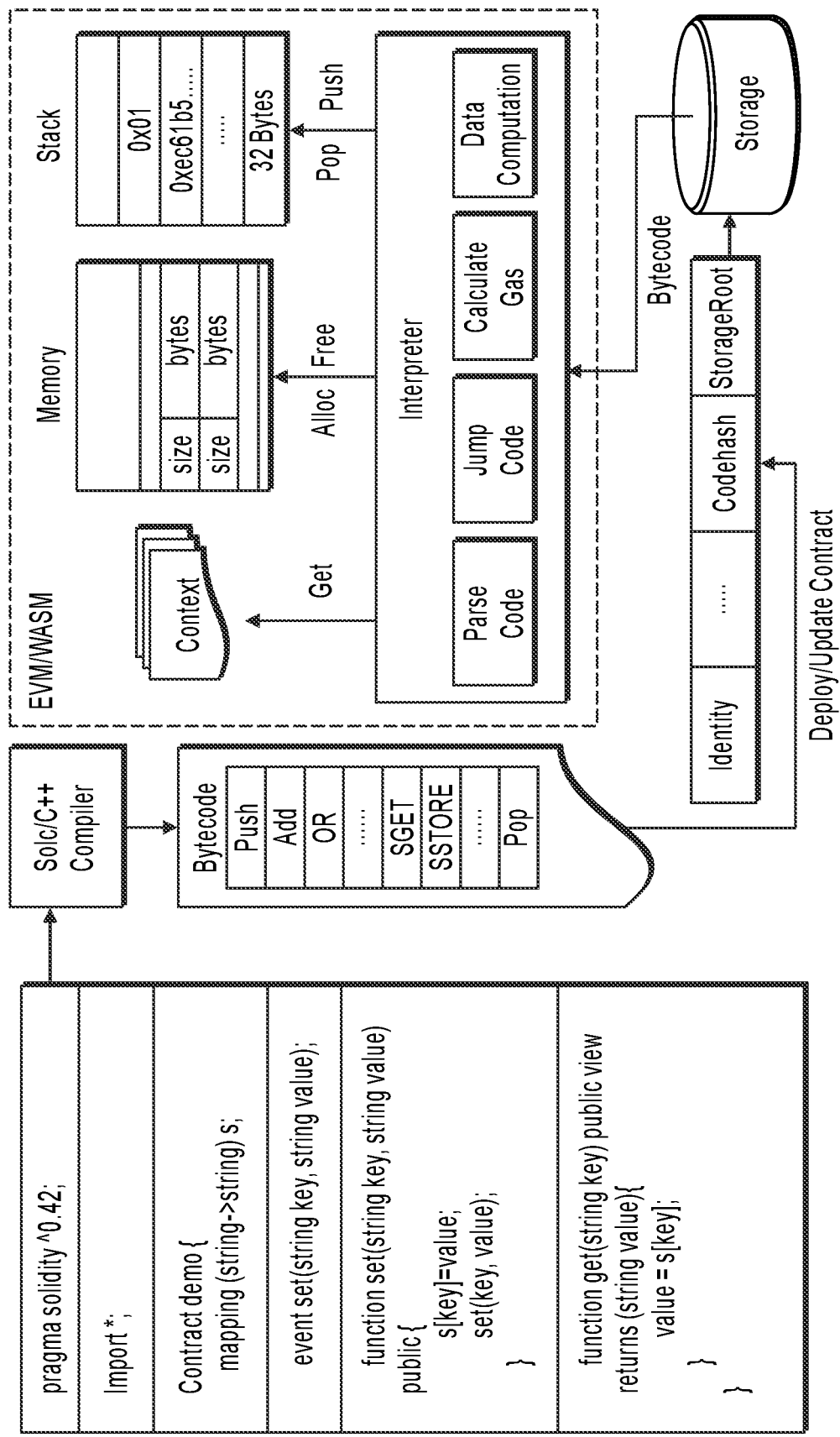
FIG. 9 is a schematic diagram of an execution process of a virtual machine included in a process of creating a smart contract and invoking a smart contract according to one or more embodiments of the present disclosure.

A transaction for creating a smart contract is sent to the blockchain network and each blockchain node can execute the transaction after consensus. Specifically, the transaction can be executed by the EVM and/or WASM of the blockchain node. As mentioned above, at this time, a contract account (including, for example, identity of account, hash value Codehash of contract, root of contract storage StorageRoot) corresponding to the smart contract appears on the blockchain and has a specific address, and the contract codes and the account storage can be stored in the storage of the contract account as shown in FIG. 9. The behaviors of the smart contract are controlled by the contract codes while the account storage of the smart contract stores a state of the contract. In other words, the smart contract enables a virtual account containing contract codes and account storage to be generated on the blockchain. For a contract deployment transaction or a contract update transaction, a value of Codehash can be generated or changed. Subsequently, the blockchain node can receive a transaction request for invoking the deployed smart contract, where the transaction request can include an address of the invoked contract, a function of the invoked contract and input parameters. Generally, after the transaction goes through consensus, each node of the blockchain can independently execute the specified invoked smart contract. Specifically, as shown in FIG. 9, the node load the bytecodes of the contract from the storage into a virtual machine (EVM and/or WASM) according to the address of the contract; further, the interpreter performs interpretation execution, for example, parsing is performed for the bytecodes of the invoked contract to obtain Opcodes and these Opcodes are stored into a memory of the virtual machine and the address of the invoked function is obtained at the same time; when Gas needs to be consumed for execution of contract is computed, showing sufficient Gas, Opcodes of the invoked function are obtained by switching to the corresponding address of the memory and then executed, and operations such as Data Computation and Push/Pop in Stack and the like are performed on the data operated by the OPcode of the called function, thus completing data computation. In this process, some context information of the contract may be needed, for example, block number, and information of initiator invoking the contract and the like. These information can be obtained from Context (Get operation). Finally, the generated state is stored into the storage by invoking a storage interface. It should be noted that the process of creating a contract may generate interpretation execution of certain functions in the contract, such as functions for initialization operations, which will also parse code, generate switch instructions, store in the Memory, and operate data in the Stack, etc. In the above-mentioned interpretation execution process, generally speaking, functions that are repeatedly executed are not cached, and even for functions that are executed many times, the virtual machine needs to repeat the parsing and executing process.

Figure 8:
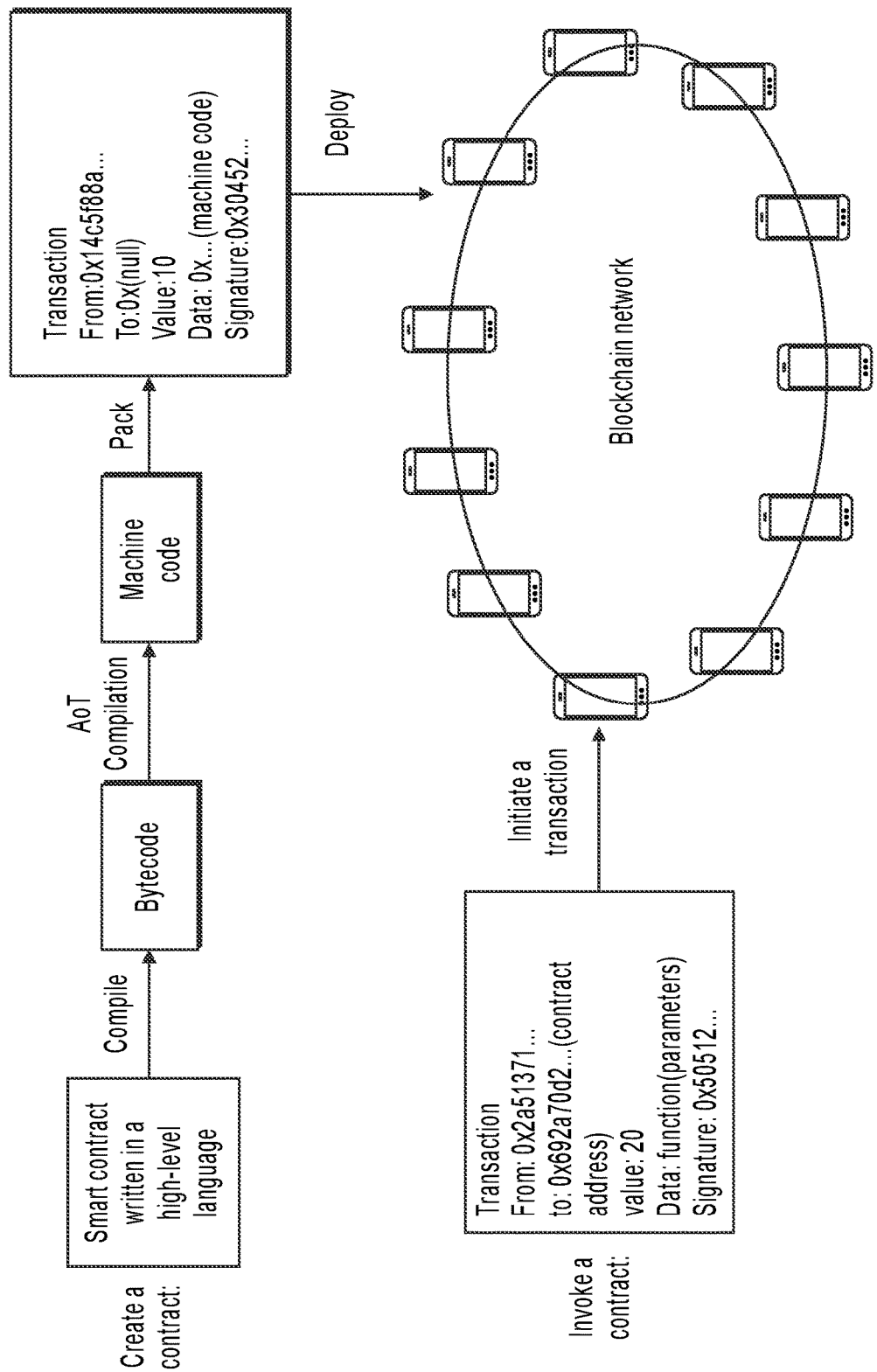
FIG. 8 is a schematic diagram of creating a smart contract and invoking a smart contract according to another embodiment of the present disclosure.

As mentioned earlier, the JVM has the advantages of cross-platform portability and the needs to improve performance, the EVM in the blockchain can also adopt technologies such as JIT and AoT to improve the execution performance of the smart contract. For example, before the smart contract is deployed on a blockchain, AoT compilation is first performed and then the compiled machine codes are stored onto chain. This way, the deployment of the contract can be completed in the process as shown in FIG. 8. The deployed contract can have a specific address on the blockchain. As such, a transaction for creating a contract initiated by a client device can include the machine codes of the contract. For example, the client device can compile the smart contract written in high-level language into bytecodes and then compile the bytecodes into machine codes through AoT locally so as to obtain machine codes. A process of executing an on-chain contract (or called a process of invoking a smart contract) can be that, for example, a client device (can be different from the client device that creates the smart contract) directly invokes the machine code on the blockchain compiled by AoT and executing. Here, in a transaction for invoking a contract, a pointed address (i.e. an address pointed to by the to field) generally can be an address of the invoked contract. Because the AoT compilation is completed before the smart contract is stored on the blockchain, the AoT can be called "off-chain AoT" for short. In the off-chain AoT compilation process, a large number of codes can be optimized. As such, the efficiency of executing contract on-chain can be greatly increased. Further, the defects are also obvious, that is, in a case of off-chain AoT, it is needed to first obtain processor architecture and operation environment and the like of the deployed target node, and otherwise, it is highly possible that the machine codes to be stored on the blockchain may not be executed on the target node subsequently. At the same time, in order to adapt to various types of target nodes, it is needed to compile into different types of machine codes through AoT. Thus, the size of the machine codes after AoT compilation will be far larger than the original size of the bytecodes of the smart contract, increasing data amount to be stored and storage overhead.

Figure 6:
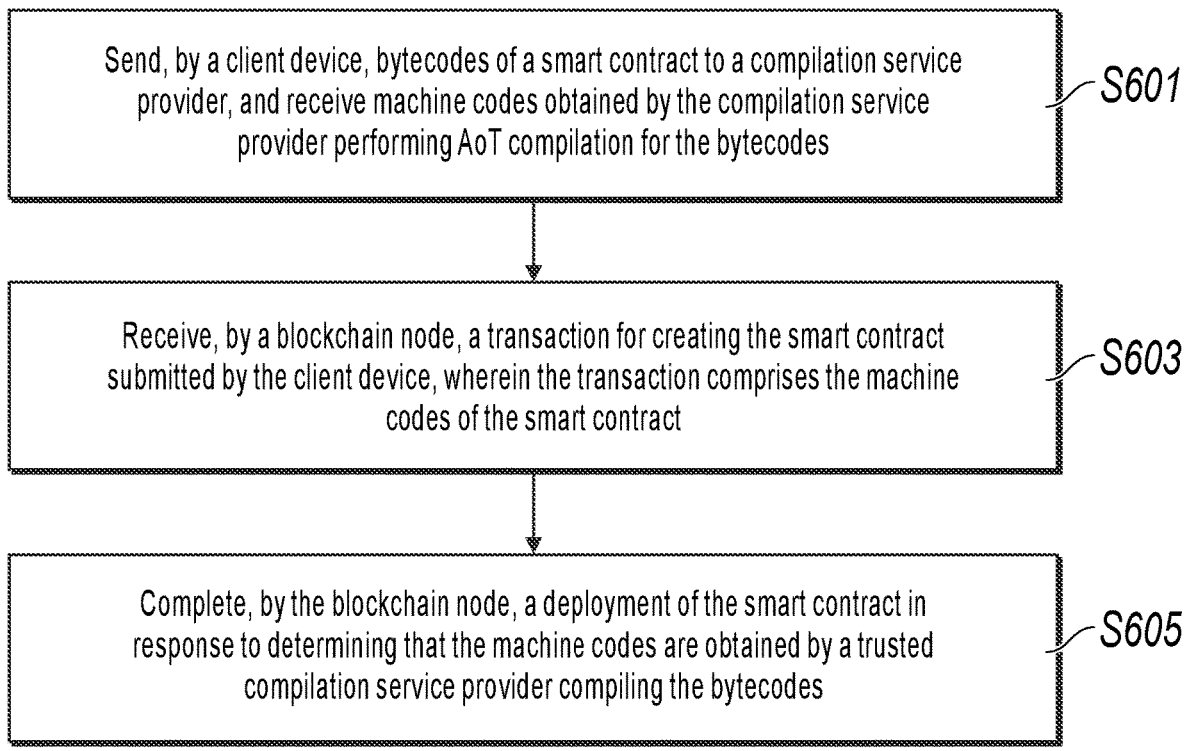
FIG. 6 is a flowchart of deploying a smart contract according to one or more embodiments of the present disclosure.

The present disclosure provides a method embodiment for executing a smart contract. As shown in FIG. 6, the method includes the following steps.

At step S601, a client device sends bytecodes of the smart contract to a compilation service provider, and receives machine codes obtained by the compilation service provider performing ahead-of-time (AoT) compilation for the bytecodes.

At step S603, a blockchain node receives a transaction for creating the smart contract submitted by the client device, wherein the transaction includes the machine codes of the smart contract.

A user can write a smart contract using a high-level language. The written smart contract can be compiled into bytecodes by a compiler adapting to the high-level language. Further, the user can compile the bytecodes of the smart contract into machine codes by using a specific compilation service provider, and encapsulate the machine codes of the smart contract into a transaction through the client device and then send the transaction to a blockchain network. The format of the transaction are as shown in FIGS. 3-5, where the machine codes of the smart contract to be created can be stored in the data field of the transaction.

The user can designate any compilation service provider to complete compilation operation from bytecodes to machine codes. For example, the compilation service provider can be the client device itself. The client device compiles the bytecodes of the smart contract into the machine codes and then encapsulates the machine codes of the smart contract into a transaction and then sends the transaction to the blockchain network. For another example, the compilation service provider can be a specific blockchain node, for example, can be the blockchain node receiving a transaction in the step S603, or any other blockchain nodes in the blockchain network. When the compilation service provider is a blockchain node, the user can send the bytecodes of the smart contract to the blockchain node through an off-chain channel, and the blockchain node compiles the bytecodes of the smart contract into the machine codes and then returns the machine codes to the user. Alternatively, the user can create a transaction for invoking a smart contract on the client device and includes the bytecodes of smart contract in the data field in the transaction, and the transaction invokes the smart contract already deployed on the blockchain for realizing compilation function, so that the contract codes of the smart contract are run to compile the bytecodes into corresponding machine codes. The client device can obtain a transaction receipt from the blockchain node, where the transaction receipt can include the machine codes generated by compilation. For another example, the compilation service provider can be a third-party server different from the client device and the blockchain node. The third-party server is used to provide compilation services externally. Therefore, the user can send the bytecodes of the smart contract to the third-party server so that the third-party server can compile the bytecodes of the smart contract into the machine codes. The third-party server can be a shared service platform for providing compilation services to all or at least part of users. For example, the shared service platform can be deployed at a specific cloud server or in another manner, which is not restricted in the present disclosure.

When the bytecodes of the smart contract are compiled into the machine codes, the bytecodes of the smart contract can be compiled into the machine codes through AoT. The AoT compilation technology can improve the execution performance of the smart contract. Specifically, compilation can be performed in combination with correlation of backward and forward of the program code so as to obtain the machine codes after optimized compilation. The execution efficiency of the machine codes after compilation optimization will generally be higher than that of the machine codes obtained by direct interpretation. On one hand, hardware and environment information of the blockchain node are provided to an AoT engine, so that the machine codes obtained by compilation have hardware+environment optimization, specifically including optimization in a process of generating machine codes, including optimization of instruction level, and distribution and optimization of register and the like. On the other hand, the AoT engine can analyze context information, for example, branch switch statements executed in the current function, to identify which statement has the highest switch possibility, and then adjust the statement having the highest switch possibility to be foremost, thereby first hitting the branch statement with a higher probability during execution. In the optimization process of the compiler, dead code elimination can be performed by performing data flow analysis and/or live variable analysis, for example, those non-reaching branches are eliminated. Further, optimization can be performed for loop statement and replacement is performed for common word expression and the like.

At step S605, the blockchain node completes deployment of the smart contract in response to determining that the machine codes are obtained by a trusted compilation service provider compiling the bytecodes.

Compared with the bytecodes, the machine codes can perform much more operations and thus pose a larger threat to a blockchain. For example, when the machine codes of the smart contract are tampered, the machine codes may be run to read privacy data stored on the blockchain node after the smart contract is invoked, for example, privacy data inside a trusted execution environment (TEE) deployed on the blockchain node. This may even affect normal operation of the blockchain node and damage the security and stability of the blockchain network. Therefore, when a transaction for creating a smart contract includes bytecodes of the smart contract, There can be no restrictions on the blockchain nodes; when a transaction for creating a smart contract includes machine codes of the smart contract, the blockchain node can restrict a compilation service provider of the machine codes to ensure the machine codes compiled only by a trusted compilation service provider may be deployed to the blockchain.

The blockchain node can determine whether the compilation service provider is a trusted compilation service provider based on a signature of the compilation service provider. The blockchain node can obtain the signature of the compilation service provider for the machine codes, so as to determine the compilation service provider is a trusted compilation service provider in response to that the signature is successfully verified by a pre-defined public key corresponding to the trusted compilation service provider, which is equivalent to endorsing the compiled machine codes by credibility of the trusted compilation service provider itself. By running chain codes, the blockchain node can verify the signature of the machine codes by using the public key of the trusted compilation service provider. If the signature of the machine codes is successfully verified by the public key corresponding to the trusted compilation service provider, the blockchain node can determine the compilation service provider is a trusted compilation service provider. Alternatively, the public key corresponding to the trusted compilation service provider is recorded in a system contract, and the blockchain node can invoke the system contract and send the signature of the compilation service provider for the machine codes to the system contract. Thus, the contract codes of the system contract are executed to verify the signature using the public key corresponding to the trusted compilation service provider and then the blockchain node receives an identification result returned by the system contract, where the identification result is used to indicate whether the signature is successfully verified by the public key corresponding to the trusted compilation service provider.

If the blockchain node determines whether the compilation service provider is a trusted compilation service provider by invoking the system contract, the blockchain node needs to initiate an invocation to the system contract. In one case, the transaction for creating a smart contract can include a contract address of the system contract, so that the blockchain node can invoke the contract address in a process of executing the transaction. In another case, the chain codes of the blockchain node can include the contract address of the system contract and an invocation logic for the system contract, where a trigger condition of the invocation logic can include that the blockchain node determines the type of the transaction is a contract deployment type, for example, the to field of the transaction of the contract deployment type is null. As such, when receiving a transaction of contract deployment type, the blockchain node can automatically trigger an invocation to the system contract. If the blockchain node only desires to restrict the deployment behaviors of a smart contract of machine code type and does not restrict the deployment behaviors of a smart contract of bytecode type or another type, the trigger condition for the invocation logic can further include that: a transaction of contract deployment type includes machine codes of a smart contract, so that the blockchain node can automatically trigger an invocation to the system contract only when receiving a transaction of contract deployment type including machine codes.

The system contract is a special smart contract. For example, the system contract can be deployed in a genesis block. Alternatively, although the system contract is deployed in a non-genesis block, the administration authority of the system contract belongs to a blockchain administrator, that is, the system contract is deployed by the blockchain administrator, only the blockchain administrator can perform operations such as version update for the system contract and different blockchain accounts can only invoke the system contract. Because deployment operation for the machine codes of the smart contract is involved, whether the compilation service provider is a trusted compilation service provider is accurately determined generally by the system contract. Of course, an ordinary smart contract can also be used to realize relevant functions realized by the system contract so as to determine whether the compilation service provider is a trusted compilation service provider, which is not restricted herein.

In an Ethereum, and a system of a public blockchain, a consortium blockchain or a private blockchain with similar principle, the blockchain node can initiate consensus for one batch of transactions. The batch of transactions can include the transaction of creating a smart contract. Generally, after consensus, each consensus node stores machine codes of the smart contract to be created locally. Each consensus node can execute the transaction of creating a smart contract locally, create a corresponding contract account, and create one address for the contract account based on the same rule, where the addresses that various consensus nodes create for the same contract are the same. In this way, deployment of the contract is completed.

Preferably, the storage is caching. By caching to a memory, faster subsequent response can be made. Specifically, the memory can be one cache region in a virtual machine. Of course, in many cases, the response speed can be increased to some extent even in case of caching to a magnetic disk.

After the smart contract is deployed, an invocation to the smart contract can be provided. As such, a client device (possibly different from the client device initiating a transaction for creating a contract at step S601) can initiate an invocation to the contract. For example, the client device initiates a transaction, where the to field is an address of the deployed smart contract, and the data field can include method and input parameters for invoking the contract. In this way, the invocation to the deployed smart contract can be realized. Generally, after one batch of transactions including the transaction for invoking a contract passed consensus, various consensus nodes execute the transactions respectively. In a case that the machine codes of the smart contract are stored in a process of invoking a contract by the blockchain node, because the machine codes themselves can be directly executed by a CPU (under the control of OS), the blockchain node can execute the smart contract at a significantly-increased speed. Further, caching the machine codes of the smart contract into a memory can further increase the execution speed of the smart contract. Of course, the execution speed can be increased to some extent even in case of caching to a magnetic disk. The blockchain node executes the machine codes, which specifically includes executing the stored machine codes corresponding to the invoked function in the smart contract.

The machine codes of the present disclosure can also be suitable for Web Assembly (WASM) virtual machine, and JavaScript Virtual Machine (JSVM) and the like in addition to the EVM, which is not restricted herein.

It should be noted that the blockchain node in the step S603 may be different from the blockchain node in the step S605. This is because a node for receiving a transaction, a node for initiating a consensus and a node for executing the transaction can be different nodes or can be the same nodes in a blockchain serving as a distributed system.

Another method embodiment for executing a smart contract in the present disclosure will be described below. The method includes the following steps.

At step A, a blockchain node receives a transaction for creating a smart contract, where the transaction includes machine codes of the smart contract, and the machine codes are obtained by a compilation service provider performing ahead-of-time (AoT) compilation for bytecodes of the smart contract.

A user can write a smart contract using a high-level language. The written smart contract can be compiled into bytecodes by a compiler adapting to the high-level language. Further, the user can compile the bytecodes of the smart contract into machine codes by a specific compilation service provider, and encapsulate the machine codes of the smart contract into a transaction through the client device and then send the transaction to a blockchain network. The format of the transaction can be as shown in FIGS. 3-5, where the machine codes of the smart contract to be created can be stored in the data field of the transaction.

The user can designate any compilation service provider to complete compilation operation from bytecodes to machine codes. For example, the compilation service provider can be the client device itself. The client device compiles the bytecodes of the smart contract into the machine codes and then encapsulates the machine codes of the smart contract into a transaction and then sends the transaction to the blockchain network. For another example, the compilation service provider can be a specific blockchain node, for example, can be the blockchain node receiving a transaction in the step A, or any other blockchain nodes in the blockchain network. When the compilation service provider is a blockchain node, the user can send the bytecodes of the smart contract to the blockchain node through an off-chain channel, and the blockchain node compiles the bytecodes of the smart contract into the machine codes and then returns the machine codes to the user. Alternatively, the user can create a transaction for invoking a smart contract on the client device and includes the bytecodes of smart contract in the data field in the transaction, the transaction invokes the smart contract already deployed on the blockchain for realizing compilation function, so that the contract codes of the smart contract are run to compile the bytecodes into corresponding machine codes. The client device can obtain a transaction receipt from the blockchain node, where the transaction receipt can include the machine codes generated by compilation. For another example, the compilation service provider can be a third-party server different from the client device and the blockchain node. The third-party server is used to provide compilation services externally. Therefore, the user can send the bytecodes of the smart contract to the third-party server so that the third-party server can compile the bytecodes of the smart contract into the machine codes. The third-party server can be a shared service platform for providing compilation services to all or at least part of users. For example, the shared service platform can be deployed at a specific cloud server or in another manner, which is not restricted in the present disclosure.

When the bytecodes of the smart contract are compiled into the machine codes, the bytecodes of the smart contract can be compiled into the machine codes through AoT. The AoT compilation technology can improve the execution performance of the smart contract. Specifically, compilation can be performed in combination with correlation of backward and forward of the program code so as to obtain the machine codes after optimized compilation. The execution efficiency of the machine codes after compilation optimization will generally be higher than that of the machine codes obtained by direct interpretation. On one hand, hardware and environment information of the blockchain node are provided to an AoT engine, so that the machine codes obtained by compilation have hardware+environment optimization, specifically including optimization in a process of generating the machine codes, including optimization of instruction level, and distribution and optimization of register and the like. On the other hand, the AoT engine can analyze context information, for example, branch switch statements executed in the current function, to identify which statement has the highest switch possibility, and then adjust the statement having the highest switch possibility to be foremost, thereby first hitting the branch statement with a higher probability during execution. In the optimization process of the compiler, dead code elimination can be performed by performing data flow analysis and/or live variable analysis, for example, those non-reaching branches are eliminated. Further, optimization can be performed for loop statement and replacement is performed for common word expression and the like.

At step B, the blockchain node completes deployment of the smart contract in response to determining that the machine codes are obtained by a trusted compilation service provider compiling the bytecodes.

Compared with the bytecodes, the machine codes can perform much more operations and thus pose a larger threat to a blockchain. For example, when the machine codes of the smart contract are tampered, after the smart contract is invoked, the machine codes may be run to read privacy data stored on the blockchain node, for example, privacy data inside a trusted execution environment (TEE) deployed on the blockchain node. This may even affect normal operation of the blockchain node and damage the security and stability of the blockchain network. Therefore, when a transaction for creating a smart contract includes bytecodes of the smart contract, the blockchain node cannot make restriction; when a transaction for creating a smart contract includes machine codes of the smart contract, the blockchain node can restrict a compilation service provider of the machine codes to ensure the machine codes compiled only by a trusted compilation service provider may be deployed to the blockchain.

The blockchain node can determine whether the compilation service provider is a trusted compilation service provider based on a signature of the compilation service provider. The blockchain node can obtain the signature of the compilation service provider for the machine codes, so as to determine the compilation service provider is a trusted compilation service provider in response to that the signature is successfully verified by a pre-defined public key corresponding to the trusted compilation service provider, which is equivalent to endorsing the compiled machine codes by credibility of the trusted compilation service provider itself. By running chain codes, the blockchain node can verify the signature of the machine codes by using the public key of the trusted compilation service provider. If the signature of the machine codes is successfully verified by the public key corresponding to the trusted compilation service provider, the blockchain node can determine the compilation service provider is a trusted compilation service provider. Alternatively, the public key corresponding to the trusted compilation service provider is recorded in a system contract, and the blockchain node can invoke the system contract and send the signature of the compilation service provider for the machine codes to the system contract. Thus, the contract codes of the system contract are executed to verify the signature using the public key corresponding to the trusted compilation service provider and then the blockchain node receives an identification result returned by the system contract, where the identification result is used to indicate whether the signature is successfully verified by the public key corresponding to the trusted compilation service provider.

If the blockchain node determines whether the compilation service provider is a trusted compilation service provider by invoking the system contract, the blockchain node needs to initiate an invocation to the system contract. In one case, the transaction for creating a smart contract can include a contract address of the system contract, so that the blockchain node can invoke the contract address in a process of executing the transaction. In another case, the chain codes of the blockchain node can include the contract address of the system contract and an invocation logic for the system contract, where a trigger condition of the invocation logic can include that the blockchain node determines the type of the transaction is a contract deployment type, for example, the to field of the transaction of the contract deployment type is null. As such, when receiving a transaction of contract deployment type, the blockchain node can automatically trigger an invocation to the system contract. If the blockchain node only desires to restrict the deployment behaviors of a smart contract of machine code type and does not restrict the deployment behaviors of a smart contract of bytecode type or another type, the trigger condition for the invocation logic can further include that: a transaction of contract deployment type includes machine codes of a smart contract, so that the blockchain node can automatically trigger an invocation to the system contract only when receiving a transaction of contract deployment type including machine codes.

The system contract is a special smart contract. For example, the system contract can be deployed in a genesis block. Alternatively, although the system contract is deployed in a non-genesis block, the administration authority of the system contract belongs to a blockchain administrator, that is, the system contract is deployed by the blockchain administrator and only the blockchain administrator can perform operations such as version update for the system contract. Different blockchain accounts can only invoke the system contract. Because deployment operation for the machine codes of the smart contract is involved, whether the compilation service provider is a trusted compilation service provider is accurately determined generally by the system contract. Of course, an ordinary smart contract can also be used to realize relevant functions realized by the system contract so as to determine whether the compilation service provider is a trusted compilation service provider, which is not restricted herein.

In an Ethereum, and a system of a public blockchain, a consortium blockchain or a private blockchain with similar principle, the blockchain node can initiate consensus for one batch of transactions. The batch of transactions can include the transaction of creating a smart contract. Generally, after consensus, each consensus node stores machine codes of the smart contract to be created locally. Each consensus node can execute the transaction of creating a smart contract locally, create a corresponding contract account, and create one address for the contract account based on the same rule, where the addresses that various consensus nodes create for the same contract are the same. In this way, deployment of the contract is completed.

Preferably, the storage is caching. By caching to a memory, faster subsequent response can be made. Specifically, the memory can be one cache region in a virtual machine. Of course, in many cases, the response speed can be increased to some extent even in case of caching to a magnetic disk.

After the smart contract is deployed, an invocation to the smart contract can be provided. As such, a client device (possibly different from the client device initiating a transaction for creating a contract at step A) can initiate an invocation to the contract. For example, the client device initiates a transaction, where the to field is an address of the deployed smart contract, and the data field can include method and input parameters for invoking the contract. In this way, the invocation to the deployed smart contract can be realized. Generally, after one batch of transactions including the transaction for invoking a contract passed consensus, various consensus nodes can execute the transactions respectively. In a case that the machine codes of the smart contract are stored in a process of invoking a contract by the blockchain node, because the machine codes themselves can be directly executed by a CPU (under the control of OS), the blockchain node can execute the smart contract at a significantly-increased speed. Further, caching the machine codes of the smart contract into a memory can further increase the execution speed of the smart contract. Of course, the execution speed can be increased to some extent even in case of caching to a magnetic disk. The blockchain node executes the machine codes, which specifically includes: executing the stored machine codes corresponding to the invoked function in the smart contract.

The machine codes of the present disclosure can also be suitable for Web Assembly (WASM) virtual machine, and JavaScript Virtual Machine (JSVM) and the like in addition to the EVM, which is not restricted herein.

It should be noted that the blockchain node in the step A may be different from the blockchain node in the step B. This is because a node for receiving a transaction, a node for initiating a consensus and a node for executing the transaction can be different nodes or can be the same nodes in a blockchain serving as a distributed system.

Figure 7:
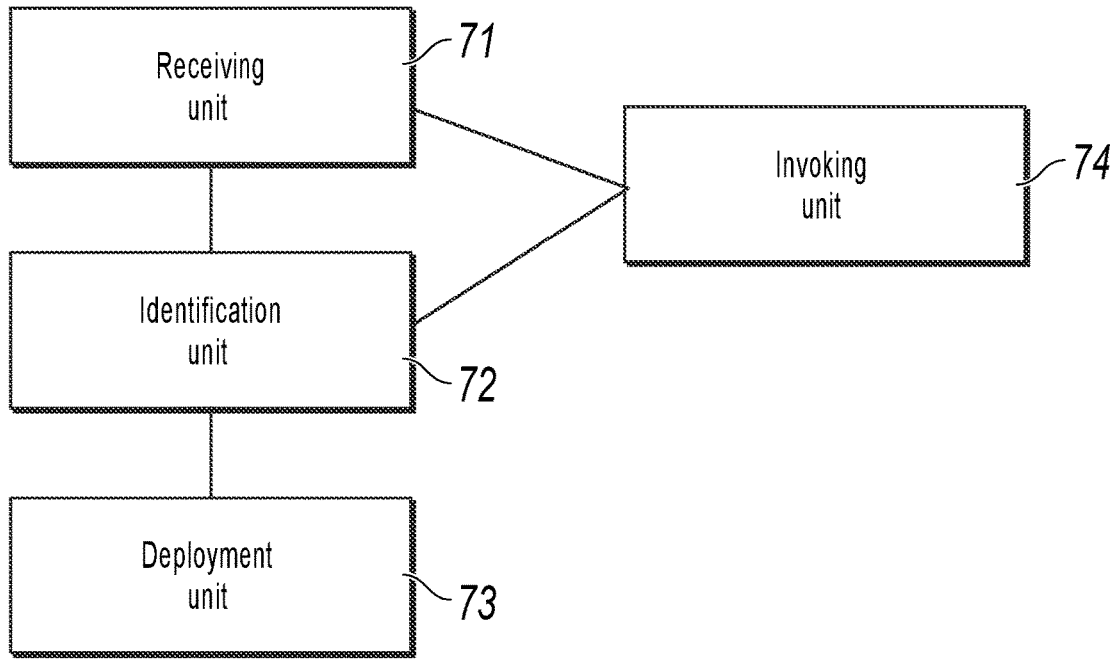
FIG. 7 is a modular structural diagram of a blockchain node according to one or more embodiments of the present disclosure.

A blockchain node embodiments for executing a smart contract in the present disclosure will be described below. As shown in FIG. 7, the blockchain node includes the following units:

a receiving unit 71, configured to receive a transaction for creating a smart contract, wherein the transaction includes machine codes of the smart contract, and the machine codes are obtained by a compilation service provider performing AoT compilation for bytecodes of the smart contract;

an identification unit 72, configured to determine whether the machine codes are obtained by a trusted compilation service provider compiling the bytecodes;

a deployment unit 73, configured to complete a deployment of the smart contract in response to determining that the machine codes are obtained by the trusted compilation service provider compiling the bytecodes.

Optionally, compiling the bytecodes of the smart contract into the machine codes through AoT includes:

performing optimized compilation in a process of performing the AoT compilation for the bytecodes of the smart contract.

Optionally, the compilation service provider includes any of a client device that submits the transaction, any blockchain node in a blockchain network, and a third-party server different from the client device and the blockchain node.

Optionally, the identification unit 72 is specifically configured to:

obtain a signature of the compilation service provider for the machine codes from the transaction;

determine the compilation service provider belongs to the trusted compilation service provider in response to that the signature is successfully verified by a pre-defined public key corresponding to the trusted compilation service provider.

Optionally, the public key corresponding to the trusted compilation service provider is recorded in a system contract, and the blockchain node further includes:

an invoking unit 74, configured to invoke the system contract, send the signature to the system contract, and receive an identification result returned by the system contract, where the identification result is used to indicate whether the signature is successfully verified by the public key corresponding to the trusted compilation service provider.

Optionally, the invoking unit 74 is specifically configured to:

read a contract address of the system contract from the transaction, and invoke the system contract based on the contract address; or, invoke the system contract according to the contract address of the system contract defined in chain codes in response to determining that a type of the transaction is a contract deployment type.

Optionally, the system contract can be deployed in a genesis block; or, an administration authority of the system contract belongs to a blockchain administrator.

The present disclosure further provides embodiments of a blockchain node, including:

a processor;

a memory having programs stored thereon, where the programs are executed by the processor to execute a smart contract according to the method as described above.

The present disclosure further provides embodiments of a storage media for storing programs, where the programs are executed to implement the method as described above.

The systems, apparatuses, modules or units described in the embodiments can be specifically implemented by a computer chip or an entity or can be implemented by a product with a particular function. A typical implementing device can be a computer and the computer can be specifically a personal computer, a laptop computer, a cellular phone, a camera phone, a smart phone, a personal digital assistant, a media player, a navigation device, an email transceiver, a game console, a tablet computer, a wearable device, or a combination of any several devices of the devices.

In a typical configuration, the computer can include one or more central processing units (CPU), input/output interfaces, network interfaces and memories.

The memory may include a non-permanent memory, a random access memory (RAM), and/or a non-volatile memory and the like in a computer readable medium, for example, read only memory (ROM), or flash RAM. The memory is one example of the computer readable medium.

The computer readable medium includes permanent, non-permanent, mobile and non-mobile media, which can realize information storage by any method or technology. The information can be computer readable instructions, data structures, program modules and other data. The examples of the computer storage media include but not restricted to: a phase change random access memory (PRAM), a Static Random Access Memory (SRAM), a Dynamic Random Access Memory (DRAM), and other types of RAMs, Read-Only Memory (ROM), an Electrically-Erasable Programmable Read-Only Memory (EEPROM), a Flash Memory, or other memory technology, CD-ROM, digital versatile disc (DVD) or other optical storage, cassette type magnetic tape, magnetic disk storage, quantum memory, storage media based on graphene, or other magnetic storage device or other non-transmission medium for storing information accessible by computing devices. According to the definition of the specification, the computer readable medium does not include transitory computer readable media, for example, modulated data signal and carriers.

It should be noted that the term "including", "containing" or any variation thereof is intended to encompass non-exclusive inclusion, so that a process, method, product or device including a series of elements includes not only those elements but also other elements not listed explicitly or those elements inherent to such a process, method, product or device. Without more restrictions, an element defined by the statement "including a . . . " shall not be precluded to include additional same elements in a process, method, product or device including the elements.

The specific embodiments are described as above. Other embodiments can also be obtained within the scope of the appended claims. In some cases, the actions or steps recorded in the claims can be performed in a sequence different from the embodiments to achieve the desired result. Further, the processes shown in drawings do not necessarily require a particular sequence or a continuous sequence shown to achieve the desired result. In some embodiments, a multi-task processing and parallel processing are possible and may also be advantageous.

The terms used in one or more embodiments of the present disclosure are for the purpose of describing particular embodiments only, and are not intended to restrict the one or more embodiments of the present disclosure. Terms "a", "the" and "said" used in their singular forms in one or more embodiments of the present disclosure and the appended claims are also intended to include plurality, unless clearly indicated otherwise in the context. It should also be understood that the term "and/or" as used herein refers to and includes any and all possible combinations of one or more of the associated listed items.

It should be understood that, although the terms "first," "second," "third," and the like may be used in one or more embodiments of the present disclosure to describe various information, such information should not be restricted to these terms. These terms are only used to distinguish one category of information from another. For example, without departing from the scope of one or more embodiments of the present disclosure, first information can be referred as second information; and similarly, the second information can also be referred as the first information. Depending on the context, the term "if" as used herein can be interpreted as "when" or "upon" or "in response to determining".

The above-mentioned disclosure is merely illustrative of preferred embodiments of one or more embodiments of the present disclosure but not intended to restrict the present disclosure, and any modifications, equivalent substitutions, adaptations thereof made within the spirit and principles of the disclosure shall be encompassed in the scope of protection of the present disclosure.

What is claimed is:

1. A computer-implemented method, comprising:
    receiving, by a blockchain node in a blockchain network, a transaction for creating a smart contract, wherein the transaction comprises i) machine codes of the smart contract that are compiled by a compilation service provider performing Ahead of Time (AoT) compilation on bytecodes of the smart contract, and ii) a signature of the compilation service provider performing the AoT compilation;
    determining that a trigger condition is satisfied, wherein the trigger condition comprises i) a type of the transaction is a contact deployment type and ii) the transaction includes the machine codes of the smart contract;
    in response to determining that the trigger condition is satisfied, invoking, by the blockchain node, a system contract i) that includes a pre-defined public key corresponding to the compilation service provider, ii) is deployed by a blockchain administrator, and iii) whose management authority belongs to the blockchain administrator;
    sending, by the blockchain node, the signature to the system contract;
    receiving, by the blockchain node, an identification result returned by the system contract, wherein the identification result indicates whether the signature is verified by the pre-defined public key corresponding to the compilation service provider;
    determining, by the blockchain node, that the compilation service provider performing the AoT compilation of the smart contract is trusted based on the identification result; and
    in response to determining that the compilation service provider is trusted, completing, by the blockchain node, a deployment of the smart contract based on the machine codes of the smart contract, wherein deployment of the smart contract comprises:
        initiating, by the blockchain node, a consensus process for creating the smart contract within a set of consensus nodes,
        creating, by the blockchain node, an address for the smart contract, wherein the address of the smart contract created by each consensus node for the smart contract is the same, and
        storing, by the blockchain node, the machine codes of the smart contract locally.

2. The computer-implemented method of claim 1, wherein the AoT compilation on the bytecodes of the smart contract comprises:
    performing an optimization in a process of performing the AoT compilation on the bytecodes of the smart contract.

3. The computer-implemented method of claim 1, wherein the compilation service provider comprises any of: a client device that submits the transaction, any blockchain node in the blockchain network, or a third-party server different from the client device and any blockchain node.

4. The computer-implemented method of claim 1, wherein invoking, by the blockchain node, the system contract comprises:
   reading, by the blockchain node, a contract address of the system contract from the transaction; and
   invoking, by the blockchain node, the system contract based on the contract address.

5. The computer-implemented method of claim 1, wherein invoking, by the blockchain node, the system contract comprises:
   invoking, by the blockchain node, the system contract according to a contract address of the system contract defined in chain codes of the blockchain node.

6. The computer-implemented method of claim 1, wherein the system contract is deployed in a genesis block.

7. The computer-implemented method of claim 1, wherein only the blockchain administrator is authorized to perform operations comprising version update for the system contract, while different blockchain accounts is only authorized to invoke the system contract.

8. A non-transitory, computer-readable medium storing one or more instructions executable by a computer system comprising a blockchain node in a blockchain network to perform operations comprising:
   receiving, by the blockchain node in the blockchain network, a transaction for creating a smart contract, wherein the transaction comprises i) machine codes of the smart contract that are compiled by a compilation service provider performing Ahead of Time (AoT) compilation on bytecodes of the smart contract, and ii) a signature of the compilation service provider performing the AoT compilation;
   determining that a trigger condition is satisfied, wherein the trigger condition comprises i) a type of the transaction is a contact deployment type and ii) the transaction includes the machine codes of the smart contract;
   in response to determining that the trigger condition is satisfied, invoking, by the blockchain node, a system contract i) that includes a pre-defined public key corresponding to the compilation service provider, ii) is deployed by a blockchain administrator, and iii) whose management authority belongs to the blockchain administrator;
   sending, by the blockchain node, the signature to the system contract;
   receiving, by the blockchain node, an identification result returned by the system contract, wherein the identification result indicates whether the signature is verified by the pre-defined public key corresponding to the compilation service provider;
   determining, by the blockchain node, that the compilation service provider performing the AoT compilation of the smart contract is trusted based on the identification result; and
   in response to determining that the compilation service provider is trusted, completing, by the blockchain node, a deployment of the smart contract based on the machine codes of the smart contract, wherein deployment of the smart contract comprises:
      initiating, by the blockchain node, a consensus process for creating the smart contract within a set of consensus nodes,
      creating, by the blockchain node, an address for the smart contract, wherein the address of the smart contract created by each consensus node for the smart contract is the same, and
      storing, by the blockchain node, the machine codes of the smart contract locally.

9. The non-transitory, computer-readable medium of claim 8, wherein the compilation service provider comprises any of: a client device that submits the transaction, any blockchain node in the blockchain network, and a third-party server different from the client device and any blockchain node.

10. The non-transitory, computer-readable medium of claim 8, wherein invoking, by the blockchain node, the system contract comprises:
    reading, by the blockchain node, a contract address of the system contract from the transaction; and
    invoking, by the blockchain node, the system contract based on the contract address.

11. The non-transitory, computer-readable medium of claim 8, wherein invoking, by the blockchain node, the system contract comprises:
    invoking, by the blockchain node, the system contract according to a contract address of the system contract defined in chain codes of the blockchain node.

12. A computer-implemented system, comprising:
    one or more computers comprising a blockchain node in a blockchain network; and
    one or more computer memory devices interoperably coupled with the one or more computers and having tangible, non-transitory, machine-readable media storing one or more instructions that, when executed by the one or more computers, perform one or more operations comprising:
    receiving, by the blockchain node in the blockchain network, a transaction for creating a smart contract, wherein the transaction comprises i) machine codes of the smart contract that are compiled by a compilation service provider performing Ahead of Time (AoT) compilation on bytecodes of the smart contract, and ii) a signature of the compilation service provider performing the AoT compilation;
    determining that a trigger condition is satisfied, wherein the trigger condition comprises i) a type of the transaction is a contact deployment type and ii) the transaction includes the machine codes of the smart contract;
    in response to determining that the trigger condition is satisfied, invoking, by the blockchain node, a system contract i) that includes a pre-defined public key corresponding to the compilation service provider, ii) is deployed by a blockchain administrator, and iii) whose management authority belongs to the blockchain administrator;
    sending, by the blockchain node, the signature to the system contract;
    receiving, by the blockchain node, an identification result returned by the system contract, wherein the identification result indicates whether the signature is verified by the pre-defined public key corresponding to the compilation service provider;

determining, by the blockchain node, that the compilation service provider performing the AoT compilation of the smart contract is trusted based on the identification result; and in response to determining that the compilation service provider is trusted, completing, by the blockchain node, a deployment of the smart contract based on the machine codes of the smart contract, wherein deployment of the smart contract comprises:

initiating, by the blockchain node, a consensus process for creating the smart contract within a set of consensus nodes, creating, by the blockchain node, an address for the smart contract, wherein the address of the smart contract created by each consensus node for the smart contract is the same, and storing, by the blockchain node, the machine codes of the smart contract locally.

13. The computer-implemented system of claim 12, wherein the compilation service provider comprises any of: a client device that submits the transaction, any blockchain node in the blockchain network, and a third-party server different from the client device and any blockchain node.

14. The computer-implemented system of claim 12, wherein invoking, by the blockchain node, the system contract comprises:

reading, by the blockchain node, a contract address of the system contract from the transaction; and invoking, by the blockchain node, the system contract based on the contract address.

15. The computer-implemented system of claim 12, wherein invoking, by the blockchain node, the system contract comprises:

invoking, by the blockchain node, the system contract according to a contract address of the system contract defined in chain codes of the blockchain node.

\* \* \* \* \*